United States Patent [19]

Fernandez

[11] Patent Number: 5,058,244
[45] Date of Patent: Oct. 22, 1991

[54] FREE FALLING CINCH TONGUE

[75] Inventor: Angel Fernandez, Mount Clemens, Mich.

[73] Assignee: TRW Vehicle Safety Systems Inc., Lyndhurst, Ohio

[21] Appl. No.: 548,109

[22] Filed: Jul. 5, 1990

[51] Int. Cl.⁵ ............ A44B 11/12; B60R 21/00; F16G 11/00
[52] U.S. Cl. .................. 24/170; 24/136 K; 24/196; 297/483
[58] Field of Search .......... 24/170, 136 R, 136 K, 24/136 L, 196; 297/483

[56] References Cited
U.S. PATENT DOCUMENTS

| | | | |
|---|---|---|---|
| 423,667 | 3/1890 | Bulluck | 24/170 |
| 2,998,625 | 9/1961 | Huber . | |
| 3,981,052 | 9/1976 | Pilarski . | |
| 3,981,535 | 9/1976 | Henderson et al. | 297/483 |
| 4,101,171 | 7/1978 | Sasaki et al. | 297/483 |
| 4,291,918 | 9/1981 | Finn et al. . | |
| 4,431,233 | 2/1984 | Ernst | 297/483 |
| 4,549,770 | 10/1985 | Kurtti . | |
| 4,551,889 | 11/1095 | Narayan et al. . | |
| 4,614,007 | 9/1986 | Else . | |
| 4,726,625 | 2/1988 | Bougher . | |

Primary Examiner—Victor N. Sakran
Attorney, Agent, or Firm—Tarolli, Sundheim & Covell

[57] ABSTRACT

A free falling cinch tongue has a lock bar which is supported to be freely rotatable about a fixed axis to move a belt clamping surface on the lock bar toward and away from a belt clamping surface on the cinch tongue frame.

22 Claims, 3 Drawing Sheets

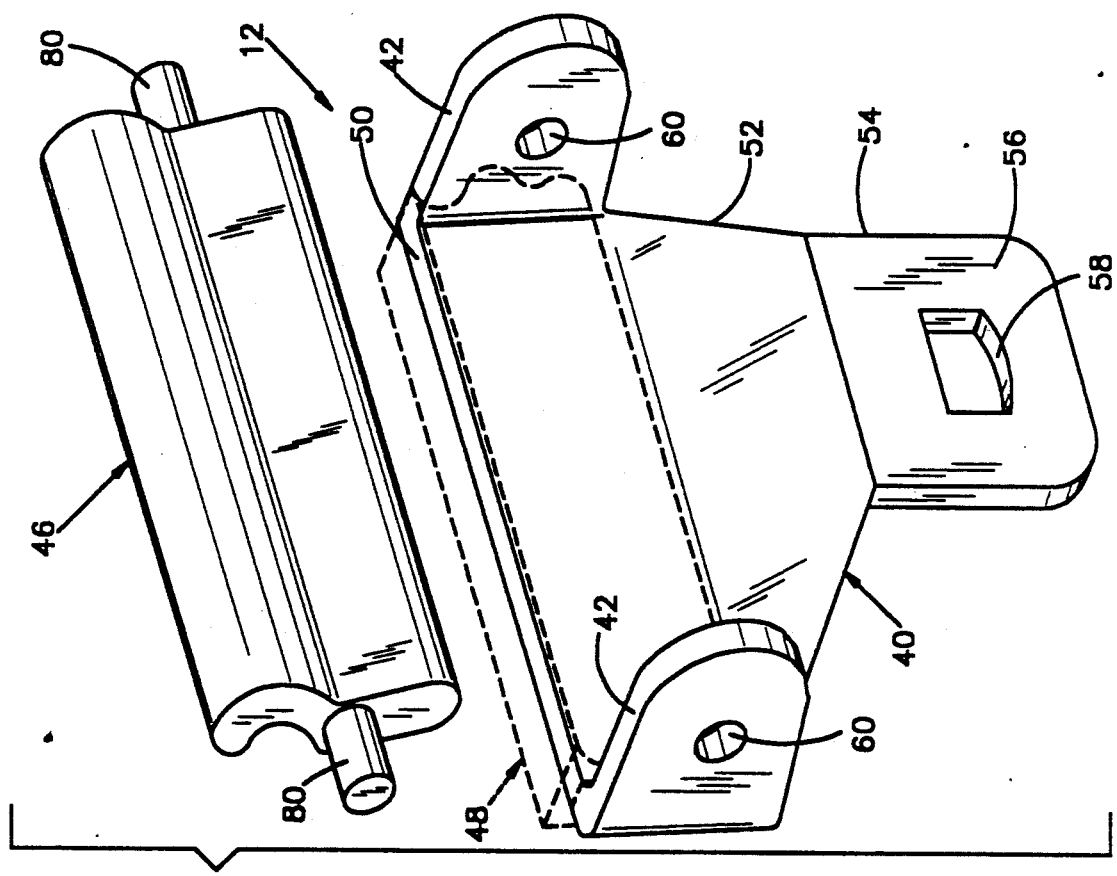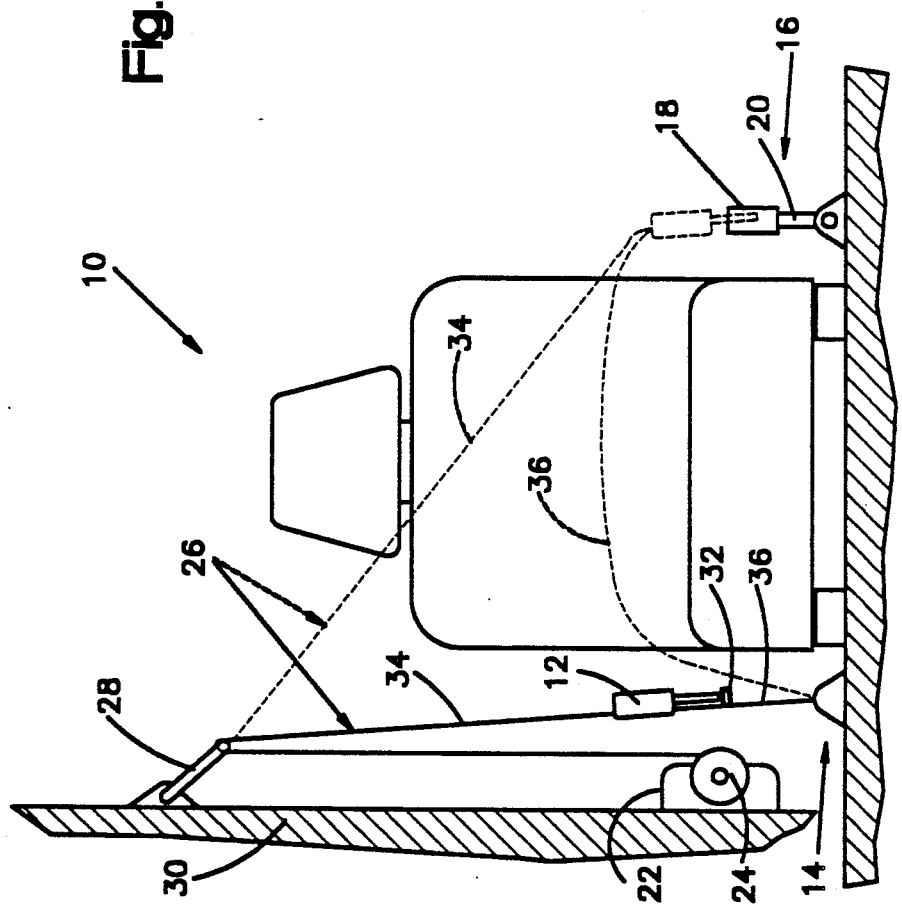

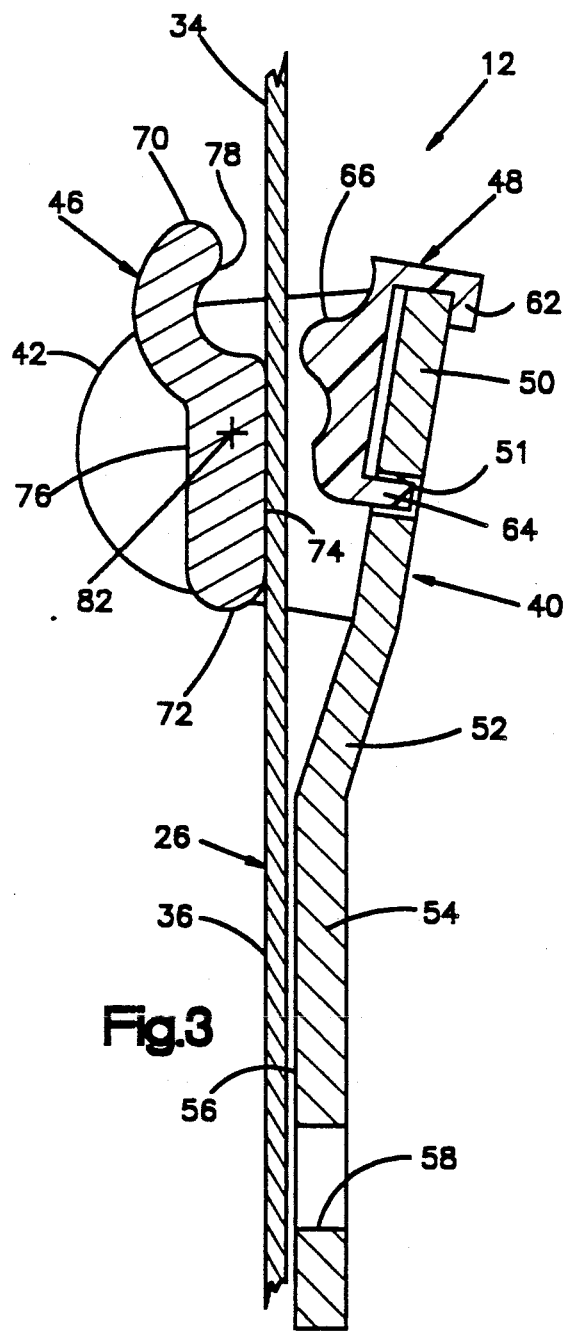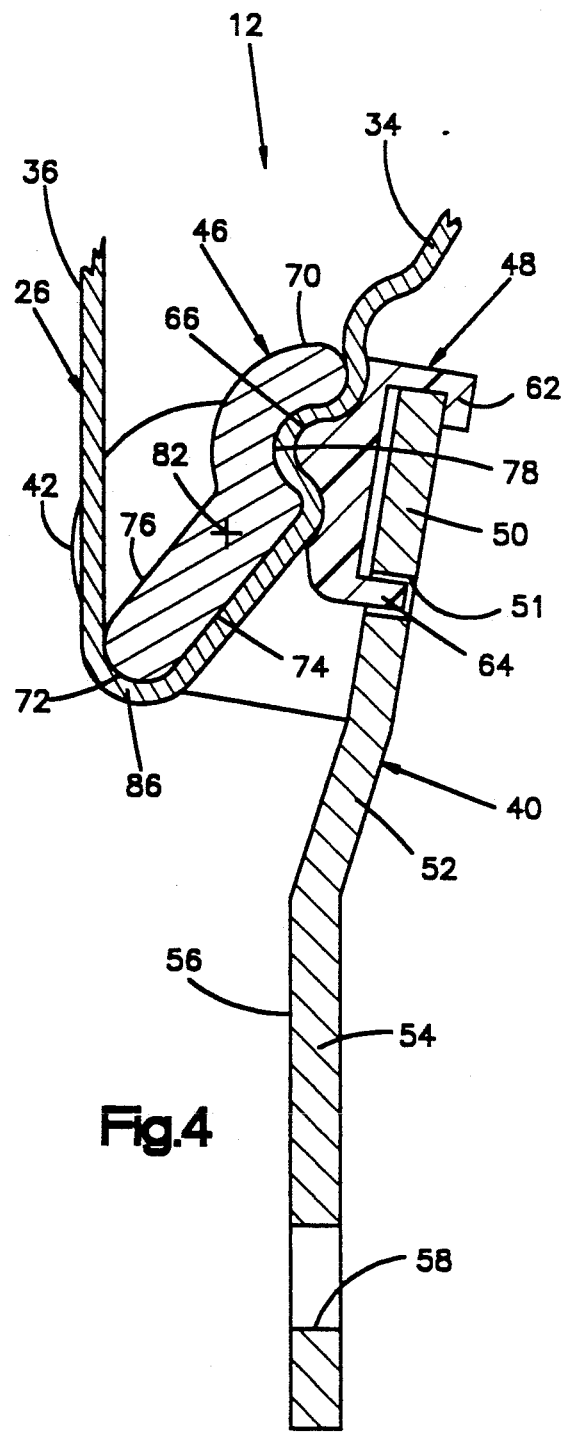

FREE FALLING CINCH TONGUE

FIELD OF THE INVENTION

The present invention relates to a vehicle seat belt system, and particularly relates to a cinch tongue used for locking a seat belt.

BACKGROUND OF THE INVENTION

A seat belt system for an occupant of a motor vehicle normally comprises a belt, a retractor for winding up the belt, and means for locking the belt in a position wrapped around the seated occupant. In a seat belt system having a shoulder belt and a lap belt, the belt normally extends upwardly from the retractor to a D-ring adjacent to the occupant's shoulder, through the D-ring, and downwardly from the D-ring to an anchoring point at the outboard side of the seat. A buckle is connected to an anchoring point at the inboard side of the seat. A cinch tongue is carried on the belt between the D-ring and the outboard anchoring point, and includes a latch plate which is insertable for locking in the buckle. The retractor permits the belt to unwind as the occupant moves the cinch tongue across to the inboard side of the seat for locking in the buckle. A shoulder belt is thereby defined between the D-ring and the locked cinch tongue, and a lap belt is defined between the locked cinch tongue and the inboard anchoring point. The retractor winds up slack in the belt to draw the shoulder and lap belts firmly against the occupant. When the cinch tongue is unlocked from the buckle, the retractor winds up the belt to carry the belt and the cinch tongue back across the occupant toward the outboard side of the seat.

The cinch tongue should slide along the belt when the occupant moves the cinch tongue in the inboard direction toward the buckle. The cinch tongue should also slide along the belt after the occupant unlocks the cinch tongue from the buckle so that the retractor can fully wind up the belt. The retractor would otherwise carry the cinch tongue upwardly to the D-ring, whereupon further movement of the belt would be prevented as the D-ring blocked further movement of the cinch tongue. Conversely, when the cinch tongue is locked in the buckle, it should clamp the belt against movement when the vehicle experiences a crash. Cinch tongues for vehicle occupant seat belt systems therefore include means for selectively clamping and releasing a seat belt.

U.S. Pat. No. 4,551,889 shows a cinch tongue having a latch portion for locking in a buckle and a lock bar for clamping a seat belt against movement through the cinch tongue. The cinch tongue comprises an elongated plate. The plate includes the latch portion at one end of the plate, and an opening for a seat belt at the other end of the plate. A pair of spaced apart flanges extending from the upper side of the plate include surfaces which define a pair of opposed angular slots. An elongated lock bar extends across the cinch tongue between the flanges, with each opposite end of the lock bar received in a slot.

A seat belt in an unclamped condition extends up through the opening in the plate, over the lock bar in a forward direction, and back down through the opening in the plate to continue in a forward direction past the latch portion of the plate. When the seat belt and the cinch tongue are moved into a position wrapped around a seated occupant, the forward portion of the seat belt is folded back toward the rear of the cinch tongue to wrap the seat belt around the lock bar. The lock bar is slidable in the slots so that tension in the folded-back portion of the seat belt pulls the lock bar to slide rearwardly in the slots and to pivot through the angular turns in the slots. Rearward movement of the lock bar in the slots causes the rear edge of the lock bar to draw the seat belt tightly against the rear edge of the opening in the plate. The seat belt is thereby releasably held against movement through the cinch tongue.

Another cinch tongue is shown in U.S. Pat. No. 4,291,918. The '918 patent shows a cinch tongue comprising a frame which has a locking tongue portion for insertion in a buckle, and a cinching member which engages a seat belt. The frame includes a pair of spaced apart flanges having opposed triangular apertures. The cinching member has end tabs received in the apertures for limited pivotal movement of the cinching member relative to the frame. A buckle for locking the cinch tongue in place includes a projection having a surface which is located opposite the cinching member when the cinch tongue is locked into the buckle. A leaf spring in the cinch tongue biases the cinching member to clamp a seat belt against the opposed buckle surface.

SUMMARY OF THE INVENTION

In accordance with the present invention, a cinch tongue for a vehicle occupant seat belt system comprises a latch plate for locking in a seat belt buckle, a first clamping surface, and a movable lock bar having a second clamping surface. The lock bar has an open position in which the second clamping surface is spaced from the first clamping surface an amount to define a clearance for a seat belt to move between the two clamping surfaces. The lock bar also has a closed position in which the second clamping surface is spaced from the first clamping surface an amount to clamp a seat belt against movement between the two clamping surfaces. A supporting means supports the lock bar to rotate about an axis which is fixed with respect to the first clamping surface, and to be freely rotatable into and out of the open and closed positions when a seat belt extends between the two clamping surfaces.

The invention provides an efficient and simplified means for clamping the seat belt against movement through the cinch tongue, because the lock bar is freely rotatable about a fixed axis and does not slide back and forth or pivot against a spring. Additionally, the seat belt is securely held against movement through the cinch tongue, because the belt is clamped between spaced apart surfaces of the cinch tongue instead of being drawn against an edge surface of the cinch tongue or being clamped against the surface of an adjoining buckle.

In accordance with a preferred embodiment of the invention, the clearance defined by the lock bar when in the open position permits a seat belt to move along a linear path between the clamping surfaces. Preferably, the lock bar is supported on a frame which defines a clearance for the seat belt to continue along a linear path through the cinch tongue between portions of the seat belt on opposite sides of the cinch tongue. Clearance for the seat belt to follow a linear path through the cinch tongue enables uninhibited relative sliding movement between the seat belt and the cinch tongue when the seat belt is being withdrawn onto a retractor.

BRIEF DESCRIPTION OF THE DRAWINGS

These and other features of the present invention will become apparent to those skilled in the art upon reading the following specification with reference to the accompanying drawings, in which:

FIG. 1 is a schematic view of a vehicle seat belt system including a cinch tongue in accordance with the present invention;

FIG. 2 is an exploded perspective view of a cinch tongue in accordance with the invention;

FIG. 3 is a side sectional view of the cinch tongue of FIG. 2 in an assembled condition;

FIG. 4 is a view of the cinch tongue of FIG. 3 in a shifted position;

DESCRIPTION OF PREFERRED EMBODIMENTS

Figure 6:
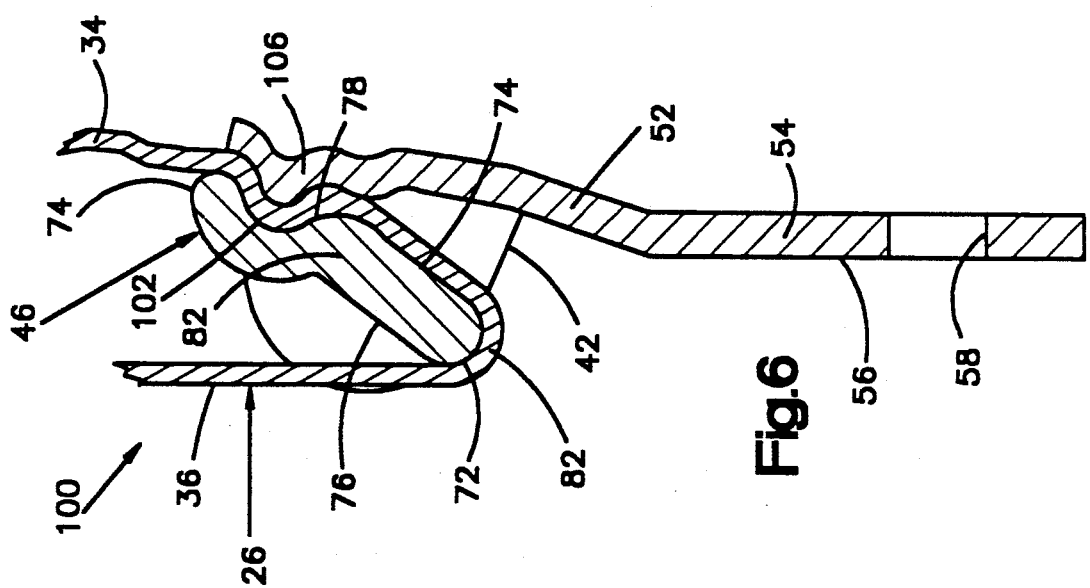
FIG. 6 is a side sectional view of the cinch tongue of FIG. 5 in an assembled condition.

In FIG. 1, there is shown a vehicle seat belt system 10 including a cinch tongue 12 in accordance with the present invention. The seat belt system 10 includes an outboard anchorage 14, an inboard anchorage 16 which comprises a buckle 18 connected to the vehicle by means of a buckle sleeve 20, and a retractor 22 which also is connected to the vehicle. A seat belt 26 has one end connected to a spool 24 in the retractor 22 for winding and unwinding in a known manner. The seat belt 26 extends up from the retractor 22 to a D-ring 28 which is mounted to the B-pillar 30 of the vehicle, through the D-ring 28, and back down to the outboard anchorage 14 where the other end of the seat belt 26 is securely fastened to the vehicle. The cinch tongue 12 is a free falling cinch tongue which is connected to the seat belt 26 to slide freely along the length of the seat belt 26. A stopper 32 is connected to the seat belt 26 to block the cinch tongue 12 from sliding all the way down to the outboard anchorage 14.

The cinch tongue 12 defines upper and lower longitudinal sections 34 and 36, respectively, of the seat belt 26 relative to the cinch tongue 12 on opposite sides of the cinch tongue 12. The lengths of the upper and lower longitudinal sections 34 and 36 vary with the position of the cinch tongue 12 as it slides along the length of the seat belt 26. The seat belt 26 and the cinch tongue 12 are movable between a retracted position shown in solid lines in FIG. 1 and a wrapped position shown in broken lines in FIG. 1. When in the retracted position, the upper and lower longitudinal sections 34 and 36 of the seat belt 26 are substantially parallel. When in the wrapped position, the upper and lower sections 34 and 36 of the seat belt 26 converge toward an apex in the seat belt 26 to define a shoulder belt and a lap belt, respectively.

As shown in FIGS. 2-4, the cinch tongue 12 comprises a frame 40, a pair of flanges 42, a lock bar 46 and an insert 48. The frame is an elongated member having a first end portion 50 and a second end portion 52. The first end portion 50 of the frame 40 includes a slot 51. The second end portion 52 of the frame 40 includes a latch plate 54 which is receivable in the buckle 18. The latch plate 54 includes a planar belt guide surface 56, and a surface defining an aperture 58 which cooperates with a movable locking member in the buckle 18 in a known manner. The flanges 42 extend outwardly from the same side of the frame 40 in parallel spaced apart positions and include surfaces 60 which define a pair of coaxial bearing openings.

As shown in FIGS. 3 and 4, the insert 48 has an upper projection 62 adapted to wrap around the first end portion 50 of the frame 40, and a lower projection 64 adapted to fit closely within the slot 51 in the first end portion 50 of the frame 40. The insert 48 is preferably formed of a resilient plastic material so as to snap into place and to remain firmly engaged in position on the frame 40. The insert 48 also includes a first clamping surface 66 which has an undulating contour including troughs and crests as shown in the Figures.

The lock bar 46 has an upper end 70, a lower end 72, and opposite side surfaces 74 and 76 which extend between the upper and lower ends 70 and 72. The upper end 70 of the lock bar 46 includes a second clamping surface 78 which is part of the inner side surface 74 and which is positioned opposite the first clamping surface 66. The second clamping surface 78 has an undulating contour which is complementary to the contour of the first clamping surface 66. A pair of trunions 80 define a lock bar axis 82. The trunnions 80 are receivable in the bearing openings defined by the flange surfaces 60 to support the lock bar 46 for rotation about the axis 82. Rotation of the lock bar 46 about the axis 82 is resisted only by friction between the relatively rotating surfaces of the trunions 80 and the flanges 42. The lock bar 46 is thereby supported to be freely rotatable between an open position wherein the second clamping surface 78 is remote from the first clamping surface 66 as shown in FIG. 3, and a closed position wherein the second clamping surface 78 is more closely spaced from the first clamping surface 66 as shown in FIG. 4. The rotational freedom of the lock bar 46 can be limited, if desired, to prevent rattling of the lock bar 46 in the cinch tongue 12 by tightening the fit between the relatively rotating surfaces.

To use the seat belt system 10, a seated occupant of the vehicle moves the cinch tongue 12 and the seat belt 26 from the retracted position shown in solid lines in FIG. 1 to the wrapped position shown in broken lines in FIG. 1. The upper and lower longitudinal sections 34 and 36 of the seat belt 26 are thereby moved from the parallel relationship shown in FIG. 3 into the converging relationship shown in FIG. 4. The seat belt 26 then includes a shoulder belt defined by the upper section 34, a lap belt defined by the lower section 36, and an apex defined by a curved belt section 86 extending around the lower end 72 of the lock bar 46. When the latch plate 54 is locked into the buckle 18, tension in the lap belt is directed through the apex against the lower end 72 of the lock bar 46 to rotate the lock bar 46 about the axis 82 in a clockwise direction as shown in FIG. 4.

During a crash, tension in the lap belt urges the lock bar 46 into the closed position to clamp the seat belt 26 from moving through the cinch tongue 12 between the first and second clamping surfaces 66 and 78. When in the closed position, the lock bar 46 defines a uniform clearance between the complementary first and second clamping surfaces 66 and 78 so that the clamped seat belt 26 is not pinched or stretched. The undulating contours of the clamping surfaces 66 and 78 grasp the seat belt 26 with a minimum of rotary force applied to the lock bar 46, and the plastic material of the insert 48 can yield slightly under an excessive force to avoid damage to the seat belt 26. The cinch tongue 12 thereby holds the seat belt 26 firmly in the wrapped position when the vehicle experiences a crash.

When the latch plate 54 is unlocked from the buckle 18 by the occupant, the retractor 22 can move the seat belt 26 and the cinch tongue 12 away from the buckle 18 toward the retracted position by winding up the seat belt 26 on the spool 24. Importantly, the lock bar 46 is held in the closed position only by tension in the lap belt and by friction between the relatively rotating surfaces of the trunnions 80 and the flanges 42. The tension applied to the upper belt section 34 by the retractor spool 24 can therefore act against the upper end 70 of the lock bar 46 to rotate the lock bar 46 back out of the closed position shown in FIG. 4 when the cinch tongue 12 is released from the buckle 18. The seat belt 26 and cinch tongue 12 will then slide freely relative to one another, and will move back from the relative positions shown in FIG. 4 to the relative positions shown in FIG. 3. Free sliding movement between the cinch tongue 12 and the seat belt 26 is aided by the linear path of movement for the seat belt 26 which is defined longitudinally through the cinch tongue 12 by the lock bar 46 and the frame 40 as shown in FIG. 3. The seat belt 26 will move smoothly through the cinch tongue 12 along the linear path as it slides against the inward side surface 74 of the lock bar 46 and the planar belt guide surface 56 of the latch plate 54.

Figure 5:
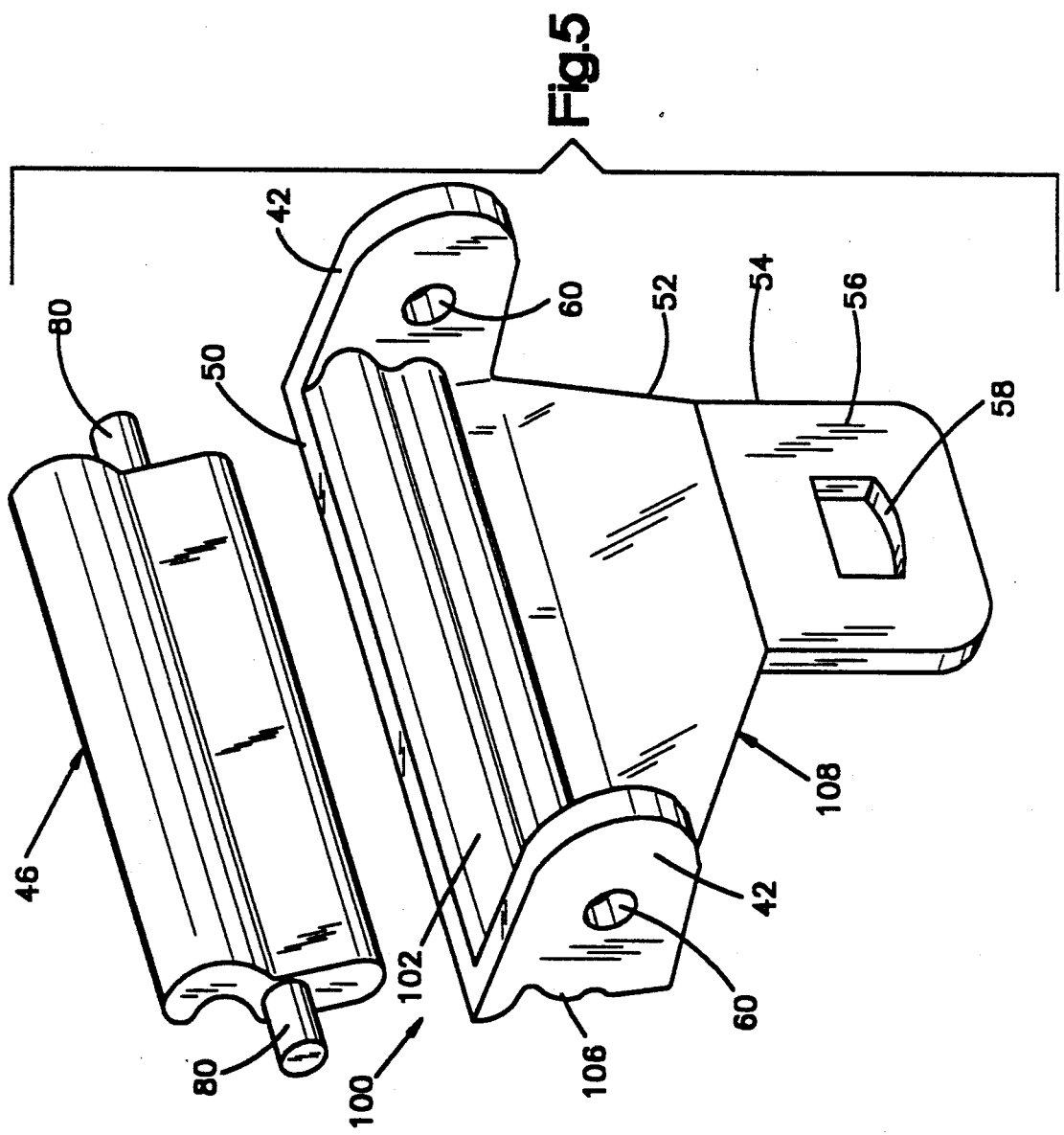
FIG. 5 is an exploded perspective view of a cinch tongue in accordance with an alternate embodiment of the present invention.

A cinch tongue 100 in accordance with an alternate embodiment of the invention is shown in FIGS. 5 and 6. The cinch tongue 100 is similar to the cinch tongue 12 described above, and common elements have the same enumeration. The cinch tongue 100 differs from the cinch tongue 12 only in that the first clamping surface 102 of the cinch tongue 100 is provided as a surface of an undulating first end portion 106 of the frame 108, as opposed to being provided on an insert supported on the frame 108.

From the above description of the invention, those skilled in the art will perceive improvements, changes and modifications. Such improvements, changes and modifications are intended to be covered by the appended claims.

Having described the invention, the following is claimed:

1. A cinch tongue for a vehicle occupant seat belt system, said cinch tongue comprising:
    a metal frame having a first end portion including a first clamping surface, said first clamping surface being formed on a plastic insert supported on said frame, said frame having a second end portion including a latch plate portion of said frame receivable for locking in a seat belt buckle;
    a lock bar having a second clamping surface, a first end portion including said second clamping surface, a second end portion, and an axis extending across said lock bar at a position between said end portions;
    a pair of spaced apart flanges extending from said frame; and
    means for supporting said lock bar between said flanges with said axis being fixed with respect to said frame and with said axis extending transversely to said frame at a position located between said first clamping surface and said latch plate portion of said frame, said lock bar being rotatable about said axis, said second clamping surface being movable in an arcuate path toward and away from said first clamping surface with rotation of said lock bar about said axis, said lock bar having a locking position wherein said second clamping surface is spaced from said first clamping surface an amount to clamp a seat belt against movement between said clamping surfaces, said lock bar being freely rotatable into and out of said locking position when a seat belt extends between said clamping surfaces.

2. A cinch tongue as defined in claim 1 wherein said first clamping surface is uniformly spaced from said second clamping surface when said lock bar is in said locking position.

3. A cinch tongue as defined in claim 2 wherein said first and second clamping surfaces are undulating surfaces having complementary contours.

4. A free falling cinch tongue for a seat belt movable from a retracted position to a restraining position wherein the seat belt has shoulder and lap belt sections extending across a seated vehicle occupant, said cinch tongue comprising:
    a latch plate for locking in a seat belt buckle;
    a first clamping surface associated with said latch plate;
    a movable lock bar having a second clamping surface, said lock bar, said first clamping surface and said latch plate defining a first path for the seat belt to extend through said cinch tongue between said clamping surfaces and past said lock bar and said latch plate when in the retracted position, said lock bar, said first clamping surface and said latch plate defining a second path for the seat belt to extend through said cinch tongue between said clamping surfaces and around said lock bar when in the restraining position;
    said lock bar having a locking position wherein said second clamping surface is spaced from said first clamping surface an amount to clamp the seat belt from moving between said clamping surfaces, and having an unlocking position wherein said second clamping surface is spaced from said first clamping surface an amount to permit the seat belt to move between said clamping surfaces;
    means for supporting said lock bar to rotate about an axis which is fixed relative to said first clamping surface, said lock bar being rotatable between said locking and unlocking positions; and
    said supporting means supporting said lock bar out of said locking position at all times when a seat belt extends along said fist path through said cinch tongue between said clamping surfaces and past said lock bar and said latch plate.

5. A cinch tongue as defined in claim 4 wherein said supporting means supports said lock bar to be rotatable into said locking position in response to tension int he seat belt extending along said second path through said cinch tongue between said clamping surfaces and around said lock bar, and supports said lock bar to be freely rotatable out of said locking position upon the release of such tension.

6. A cinch tongue as defined in claim 4, wherein said lock bar has a smooth surface for guiding the seat belt to move in opposite directions along said first path through said cinch tongue between said clamping surfaces and past said lock bar and said latch plate in sliding contact with said smooth surface of said lock bar.

7. A cinch tongue as defined in claim 4 wherein said second clamping surface is spaced from said first clamping surface an amount to permit the seat belt to move relative to said cinch tongue in a linear path extending between said clamping surfaces and beyond said lock bar when said lock bar is in said unlocking position.

8. A cinch tongue as defined in claim 4 wherein said first clamping surface is uniformly spaced from said second clamping surface when said lock bar is in said locking position.

9. A cinch tongue as defined in claim 8 wherein said first and second clamping surfaces are undulating surfaces having complementary contours.

10. A cinch tongue as defined in claim 4 wherein said lock bar has a first end portion on one side of said axis and a second end portion on the opposite side of said axis, said second clamping surface being located on said first end portion of said lock bar and remaining on said first side of said axis through out rotation of said lock bar about said axis.

11. A cinch tongue as defined in claim 4 wherein said lock bar has first end portion on one side of said axis and a second end portion on the opposite side of said axis, said first end portion having said second clamping surface and having a first end, said first end being spaced from said axis a distance greater than the distance between said axis and said first clamping surface.

12. A safety apparatus for use in restraining an occupant of a vehicle in a vehicle seat against movement relative to the vehicle seat, said safety apparatus comprising:
  a belt for restraining the occupant of the vehicle in the vehicle seat, said belt being movable into a restraining position having a first portion extending across the lap of the occupant of the vehicle and a second portion extending across the torso of the occupant of the vehicle, said belt being movable into a retracted position located on one side of the vehicle seat when not restraining the occupant of he vehicle;
  a buckle; and
  a free failing cinch tongue slidably mounted on said belt and connectable with said buckle to secure said first portion of said belt across the lap of the occupant of the vehicle and to secure said second portion of said belt across the torso of the occupant of the vehicle, said free falling cinch tongue including:
    a latch plate for locking in said buckle;
    a first clamping surface associated with said latch plate, said first clamping surface being located on one side of said belt;
    a movable lock bar having a second clamping surface located on the other side of said belt, said lock bar having a locking position wherein said second clamping surface is spaced from said first clamping surface an amount to clamp said belt from moving between said clamping surfaces, and having an unlocking position wherein said second clamping surface is spaced from said first clamping surface an amount to permit said belt to move between said clamping surfaces, said lock bar contacting a portion of said belt extending around said lock bar when said belt is in said restraining position; and
    means for supporting said lock bar to rotate about an axis which is fixed relative to said first clamping surface, said lock bar being rotatable into said locking position by the influence of longitudinal tension in said belt when said belt contacts and extends around said lock bar in said restraining position, said lock bar being freely rotatable out of said locking position upon the release of such longitudinal tension in said belt.

13. A safety apparatus as defined in claim 12 wherein said belt contacts said lock bar and urges said lock bar to rotate toward said locking position when moving from said retracted position to said restraining position, said supporting means including means for supporting said lock bar out of said locking position at all times when said belt does not urge said lock bar to rotate into said locking position.

14. A safety apparatus as defined in claim 12 wherein said lock bar has a surface means including a smooth surface for guiding said belt to move in opposite directions relative to said cinch tongue past said lock bar in sliding contact with said smooth surface without rotating said lock bar into said locking position.

15. A safety apparatus as defined in claim 12 wherein said supporting means defines said axis at a location between said first clamping surface and said latch plate.

16. A safety apparatus as defined in claim 15 wherein said lock bar has a first end portion on one side of said axis and a second end portion on the opposite side of said axis, said second clamping surface being located on said first end portion of said lock bar and remaining on said one side of said axis throughout rotation of said lock bar about said axis.

17. A safety apparatus as defined in claim 16 wherein said second end portion of said lock bar is located between said axis and said latch plate.

18. A safety apparatus as defined in claim 17 wherein said first end portion of said lock bar extends radially relative to said axis a distance greater than the distance between said axis and said first clamping surface.

19. A safety apparatus as defined in claim 12 wherein said first and second clamping surfaces are undulating surfaces having complementary contours, said second clamping surface being uniformly spaced from said first clamping surface when said lock bar is in said locking position.

20. A safety apparatus as defined in claim 12 wherein said frame is formed of metal, said first clamping surface being formed on a plastic insert supported on said frame.

21. A cinch tongue for a vehicle occupant seat belt, said cinch tongue comprising:
  a metal frame slidable relative to the seat belt and movable to carry the seat belt form a retracted position to a locked position wherein the seat belt has shoulder and lap sections which converge toward an apex in said cinch tongue, said frame having a first end portion including a first clamping surface, said first clamping surface being formed on a plastic insert supported on said frame and having an undulating contour, said frame having a second end portion including a latch plate insertable for locking in a seat belt buckle;
  a lock bar having a first end portion, a second end portion, and a transverse axis at a position between said end portions, said lock bar being supported by said frame with said axis fixed relative to said frame and with said axis extending transversely to said frame in a position located between said first clamping surface and said latch plate, said first end portion of said lock bar having a second clamping surface with an undulating contour complementary to the contour of said first clamping surface;

means for supporting said lock bar to rotate freely about said axis in response to a force exerted against said second end portion of said lock bar by the seat belt having the apex thereof engaging said second end portion of said lock bar when the seat belt is carried by said frame into a locked position, said lock bar being rotatable into a position in which said lock bar clamps the seat belt between surfaces of said cinch tongue to restrain relative sliding movement of said frame and the seat belt, said second clamping surface being movable in an arcuate path toward and away from said first clamping surface with rotation of said lock bar about said axis, said lock bar having a closed position with said second clamping surface spaced from said first clamping surface an amount to clamp the seat belt against said clamping surfaces, and an open position with said second clamping surface spaced from said first clamping surface an amount to define a clearance for the seat belt to move along a linear path between said clamping surfaces; and said frame defining a clearance for said linear path to extend through said cinch tongue between sections of the seat belt on opposite sides of said cinch tongue.

22. A cinch tongue for a vehicle occupant seat belt system, said cinch tongue comprising:

a metal frame having a first end portion including a first clamping surface, said first clamping surface being formed on a plastic body supported on said frame, said frame having a second end portion including a latch plate portion of said frame receivable for locking in a seat belt buckle;

a lock bar having a second clamping surface, a first end portion having said second clamping surface, a second end portion, and an axis extending across said lock bar at a position between said end portions;

a pair of spaced apart flanges extending from said frame; and means for supporting said lock bar between said flanges with said axis being fixed with respect to said frame and with said axis extending transversely to said frame, said lock bar being rotatable about said axis, said second clamping surface being movable in an arcuate path toward and away from said first clamping surface with rotation of said lock bar about said axis, said lock bar having a locking position wherein said second clamping surface is spaced from said first clamping surface an amount to clamp a seat belt against movement between said clamping surfaces, said lock bar being rotatable into and out of said locking position when a seat belt extends between said clamping surfaces.

* * * * *

UNITED STATES PATENT AND TRADEMARK OFFICE
CERTIFICATE OF CORRECTION

PATENT NO. : 5,058,244

DATED : October 22, 1991

INVENTOR(S) : Angel Fernandez

It is certified that error appears in the above-identified patent and that said Letters Patent is hereby corrected as shown below:

Column 6, Line 49, Claim 4, change "fist" to --first--.

Line 54, Claim 5, change "int he" to --in the--.

Column 7, Line 16, Claim 10, change "through out" to --throughout--.

Line 37, Claim 12, change "he" to --the--.

Line 39, Claim 12, change "failing" to --falling--.

Column 8, Line 49, Claim 21, change "form" to --from--.

Signed and Sealed this

Twenty-third Day of March, 1993

*Attest:*

STEPHEN G. KUNIN

*Attesting Officer*     *Acting Commissioner of Patents and Trademarks*